Patented Mar. 9, 1943

2,313,685

UNITED STATES PATENT OFFICE 2,313,685

GLASS AND PROCESS OF MAKING THE SAME

Harry A. Truby, New Kensington, Pa., assignor to Pittsburgh Plate Glass Company, Allegheny County, Pa., a corporation of Pennsylvania No Drawing. Application January 31, 1941, Serial No. 376,855

5 Claims. (Cl. 106—53)

The present invention relates to optical glasses and more particularly to the barium crown glasses which contain relatively large amounts of barium oxide.

One object of the present invention is the provision of a high barium crown glass which is substantially colorless.

A further object of the invention is to provide a process by means of which the characteristic yellow color of high barium content glasses may be substantially eliminated.

Other objects and advantages of the invention will become more apparent from the following detailed description of certain preferred embodiments thereof.

Barium crown glasses have definite optical properties which make them particularly suitable for the production of lenses in various types of optical instruments. These glasses have an index of refraction of from 1.575 to 1.630 and a dispersion factor of from 45 to 65.

One inherent disadvantage of these barium crown glasses is a characteristic yellow color, which obviously will detract from the transparency of the glasses and at the same time impede the free transmission of the full range of the color spectrum. Many efforts have been made to eliminate the color from the barium crown glasses, but alterations of the glass composition to this end have resulted in throwing the optical properties of the glasses outside of the recognized limits.

It has been ascertained that the addition of a phosphate to a high barium crown glass will eliminate substantially all of the color from that glass. The amount of phosphate necessary to accomplish this result will of course depend upon the depth of color which will be present in the untreated glass. Under ordinary circumstances, from .5% to 1.5% by weight of a phosphate will be sufficient.

The compositions of the barium crown glasses vary considerably. The following table will, however, illustrate three typical batches which will produce substantially colorless barium crown glasses:

|  | 1 | 2 | 3 |
|---|---|---|---|
|  | Pounds | Pounds | Pounds |
| Sand | 975 | 975 | 975 |
| Barium carbonate | 1573 | 1601 | 1605 |
| Barium nitrate | 120 | 103 | 108 |
| Lead mono-oxide | 146 | 151 | 149 |
| Zinc oxide | 164 | 142 | 157 |
| Boric acid | 540 | 520 | 535 |
| Calcium carbonate | 208 | 208 | 208 |
| Titanium dioxide | 120 | 120 | 120 |
| Zirconium dioxide | 65 | 65 | 65 |
| Calcium mono-phosphate | 45 |  |  |
| Arsenious oxide | 15 | 15 | 15 |
| Antimony oxide | 15 | 15 | 15 |
| Ammonium mono-phosphate |  | 50 |  |
| Aluminum metaphosphate |  |  | 40 |

These batches will produce glasses having the following compositions:

|  | I | II | III |
|---|---|---|---|
| $SiO_2$ | 30.05 | 30.26 | 29.84 |
| $BaO$ | 39.83 | 40.42 | 40.21 |
| $B_2O_3$ | 9.38 | 9.08 | 9.25 |
| $ZnO$ | 5.06 | 4.40 | 4.81 |
| $PbO$ | 4.50 | 4.68 | 4.57 |
| $CaO$ | 3.83 | 3.55 | 3.50 |
| $TiO_2$ | 3.68 | 3.72 | 3.68 |
| $ZrO_2$ | 2.00 | 2.02 | 1.99 |
| $P_2O_5$ | 0.77 | 0.95 | 0.99 |
| $As_2O_3$ | 0.45 | 0.46 | 0.46 |
| $Sb_2O_3$ | 0.45 | 0.46 | 0.46 |
| $Al_2O_3$ |  |  | 0.24 |

It will at once be apparent that various modifications in the nature of the several constituents in a particular batch and the percentage composition thereof are possible without departing from the spirit of the invention or the scope of the appended claims.

What I claim is:

1. A process of obtaining substantially colorless high barium crown glasses, which comprises adding from 0.5 to 1.5% by weight of a phosphate to the batch from which the glass is prepared, to eliminate the color normally resulting when the batch is melted.

2. A process of obtaining substantially colorless high barium crown glasses, which comprises adding from 0.5 to 1.5% by weight of calcium monophosphate to the batch from which the glass is prepared, to eliminate the color normally resulting when the batch is melted.

3. A barium crown glass containing in excess of 30% by weight of barium oxide and approximately 1% phosphoric oxide.

4. A barium crown glass containing in excess of 30% of barium oxide, lead oxide, titanium dioxide, boric oxide and approximately 1% of phosphoric oxide.

5. A colorless barium crown glass of the following composition:

| | |
|---|---|
| $SiO_2$ | 30.05 |
| $BaO$ | 39.83 |
| $B_2O_3$ | 9.38 |
| $ZnO$ | 5.06 |
| $PbO$ | 4.50 |
| $CaO$ | 3.83 |
| $TiO_2$ | 3.68 |
| $ZrO_2$ | 2.00 |
| $P_2O_5$ | 0.77 |
| $As_2O_3$ | 0.45 |
| $Sb_2O_3$ | 0.45 |

HARRY A. TRUBY.